US009059759B2

(12) United States Patent
Maguire

(10) Patent No.: US 9,059,759 B2
(45) Date of Patent: *Jun. 16, 2015

(54) SWITCHABLE ANTENNA ELEMENTS FOR A WIRELESS COMMUNICATIONS DEVICE

(71) Applicant: Facebook, Inc., Menlo Park, CA (US)

(72) Inventor: Yael G. Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,851

(22) Filed: Aug. 26, 2014

(65) Prior Publication Data

US 2014/0364068 A1 Dec. 11, 2014

Related U.S. Application Data

(63) Continuation of application No. 13/485,139, filed on May 31, 2012, now Pat. No. 8,903,329.

(60) Provisional application No. 61/491,380, filed on May 31, 2011.

(51) Int. Cl.
*H04B 1/00* (2006.01)
*H04B 7/00* (2006.01)
*H04B 7/06* (2006.01)
*H04B 5/02* (2006.01)
*H01Q 1/22* (2006.01)
*H01Q 1/24* (2006.01)
*H01Q 3/24* (2006.01)
*H01Q 21/06* (2006.01)
*H04B 17/10* (2015.01)
*H04B 1/04* (2006.01)

(52) U.S. Cl.
CPC ............. *H04B 7/0608* (2013.01); *H04B 5/02* (2013.01); *H04B 7/0691* (2013.01); *H01Q 1/2208* (2013.01); *H01Q 1/245* (2013.01); *H01Q 3/24* (2013.01); *H01Q 21/065* (2013.01); *H04B 17/103* (2015.01)

(58) Field of Classification Search
CPC .......................... H04B 7/0404; H04B 7/0608
USPC ................. 455/277.1, 103, 69, 73, 106, 272, 455/279.1, 553.1, 562.1, 132, 133
See application file for complete search history.

(56) References Cited

U.S. PATENT DOCUMENTS 3,634,884 A 1/1972 Ross
4,008,473 A 2/1977 Hinachi
5,532,697 A 7/1996 Hidaka (Continued)

OTHER PUBLICATIONS

International Search Report and Written Opinion for International Application No. PCT/US2012/040199, Dec. 28, 2012.

(Continued)

*Primary Examiner* — Eugene Yun
(74) *Attorney, Agent, or Firm* — Baker Botts L.L.P.

(57) ABSTRACT

A wireless communications device includes multiple switchable antenna elements that may be used to improve interfacing of the wireless communications device with other devices, such as for interfacing of an RFID-equipped mobile communications device with other RFID devices (e.g., to better ensure power delivery to and/or communication with such other RFID devices) and/or may be used to characterize various aspects of the environment around the wireless communications device, such as for proximity-based functionality.

24 Claims, 9 Drawing Sheets

(56) References Cited

U.S. PATENT DOCUMENTS

| | | | |
|---|---|---|---|
| 5,534,871 | A | 7/1996 | Hidaka |
| 6,496,136 | B1 | 12/2002 | Mucciardi |
| 6,633,254 | B1 | 10/2003 | Sutphin |
| 6,895,225 | B1 * | 5/2005 | Talvitie et al. ............ 455/78 |
| 8,175,564 | B2 * | 5/2012 | Saito ....................... 455/277.1 |
| 8,525,730 | B2 * | 9/2013 | Christian et al. ...... 343/700 MS |
| 8,903,329 | B2 * | 12/2014 | Maguire ...................... 455/69 |
| 2002/0033803 | A1 | 3/2002 | Holzrichter |
| 2006/0077052 | A1 | 4/2006 | Matsuoka |
| 2007/0035399 | A1 | 2/2007 | Hecht |
| 2007/0109177 | A1 | 5/2007 | Baath |
| 2009/0322592 | A1 | 12/2009 | Kai |
| 2011/0187578 | A1 | 8/2011 | Farneth |
| 2015/0018676 | A1 | 1/2015 | Barak |

OTHER PUBLICATIONS

International Search Report and Written Opinion for International Application No. PCT/US2014/018579, Jun. 27, 2014.

Non-Final Office Action for U.S. Appl. No. 13/485,139, Sep. 20, 2012.
Response to Non-Final Office Action for U.S. Appl. No. 13/485,139, Nov. 26, 2012.
Final Office Action for U.S. Appl. No. 13/485,139, Jan. 29, 2013.
Response to Final Office Action for U.S. Appl. No. 13/485,139, Apr. 16, 2013.
Non-Final Office Action for U.S. Appl. No. 13/485,139, Aug. 5, 2013.
Response to Non-Final Office Action for U.S. Appl. No. 13/485,139, Jan. 27, 2014.
Final Office Action for U.S. Appl. No. 13/485,139, Feb. 25, 2014.
Response to Final Office Action for U.S. Appl. No. 13/485,13, Jun. 19, 2014.
Notice of Allowance for U.S. Appl. No. 13/485,139, Jul. 18, 2014.
Amendment After Allowance as filed for U.S. Appl. No. 13/485,139, Aug. 12, 2014.
Non-Final Office Action for U.S. Appl. No. 13/781,271, filed Feb. 9, 2015.
Response to Non-Final Office Action for U.S. Appl. No. 13/781,271, filed Apr. 1, 2015.

* cited by examiner

SWITCHABLE ANTENNA ELEMENTS FOR A WIRELESS COMMUNICATIONS DEVICE

PRIORITY

This application is a continuation under 35 U.S.C. §120 of U.S. patent application Ser. No. 13/485,139, filed 31 May 2012, which claims the benefit under 35 U.S.C. §119(e) of U.S. Provisional Patent Application No. 61/491,380, filed 31 May 2011, which is incorporated herein by reference.

TECHNICAL FIELD

The present invention relates to antenna elements for a wireless communications device.

BACKGROUND

Mobile communications devices communicate wirelessly with various types of devices, such as base stations, satellites and other wireless devices, using any of a number of wireless protocols using electromagnetic waves as RF signals. In some mobile devices, the RF signal is at ISM-band frequencies, between about 2.400 GHz and about 2.483 GHz (used for IEEE 802.11 Wi-Fi and Bluetooth). In other mobile devices, the RF signal is transmitted at five GHz U-NII band frequencies, between about 4915 MHz and about 5825 MHz (used for Wi-Fi). In other mobile devices, the RF signal is at 1575.42 and 1227.60 MHz (used for GPS). In other mobile devices, the RF signal is at UMTS/LTE band frequencies, which may be about 800 MHz, about 850 MHz, about 900 MHz, about 1500 MHz, about 1700 MHz, about 1800 MHz, about 1900 MHz, or about 2100 MHz. Of course, other frequency bands may be supported by the mobile device. For each frequency band supported by the mobile device, an antenna must be able to transduce the electromagnetic wave into a voltage at a specified impedance.

The mobile device typically has antennas that may be planar or three-dimensional structures distributed with respect to a device housing, e.g., embedded within the mechanical structure of the device. There may be a number of antennas greater than, equal to or less than the number of wireless frequencies and standards supported by the device. A set of antennas may be around the perimeter of the device, on the back, and/or on the front.

Most materials are not RF transparent and will cause diffraction effects. One of the challenges with mobile devices is that human body parts, such as hands and arms, may attenuate the signal produced from a transmitter and/or may attenuate signals transmitted by other devices, e.g., due the absorption/redirection of radio frequency signals on the human body. For example, a hand holding a mobile communication device can affect transmission and reception of wireless communication signals.

SUMMARY OF PARTICULAR EMBODIMENTS

In a first embodiment of the invention there is provided a wireless communications device having a housing, an RF transceiver disposed in the housing, a plurality of antennas coupled to the transceiver and distributed with respect to the housing; and processing circuitry disposed in the housing and coupled to the RF transceiver. The processing circuitry is configured to cause the RF transceiver to transmit an RF reference signal, to determine at least one characteristic of the RF reference signal reflected back from each of the plurality of antennas, to store the at least one determined characteristics, and to process the at least one determined characteristics in order to select at least one antenna of the plurality of antennas based on the at least one determined characteristics.

In a further related embodiment, the processing circuitry is configured to select a plurality of antennas based on the at least one characteristic of the reflected signal from each of the plurality of antennas and to selectively couple the plurality of selected antennas to the transceiver. Optionally, the communications device includes a programmable switching device coupled to the plurality of antennas and to the processing circuitry, wherein the processing circuitry is configured to selectively couple the plurality of selected antennas to the transceiver via the programmable switching device. Also optionally, the processing circuitry is configured to selectively couple the plurality of selected antennas to the transceiver in parallel via the programmable switching device.

In another related embodiment, the device includes a controllable impedance coupled to the plurality of antennas and to the processing circuitry, wherein the processing circuitry is configured to selectively control impedance between the RF transceiver and at least one antenna.

In yet another related embodiment, the at least one characteristic includes at least one of amplitude, phase, dispersion, waveform shape, or distortion.

In another embodiment, the invention is a method of providing RF communication using a wireless communications device having an RF transceiver and a plurality of antennas coupled to the RF transceiver. The method of this embodiment includes:

at the wireless communications device, transmitting an RF reference signal;

determining at least one characteristic of the RF reference signal reflected back from each of the plurality of antennas;

storing the at least one determined characteristics; and processing the at least one determined characteristics in order to select at least one antenna of the plurality of antennas based on the at least one determined characteristics.

In a related embodiment, processing the at least one determined characteristics in order to select at least one antenna of the plurality of antennas based on the at least one determined characteristics includes:

selecting a plurality of antennas based on the at least one characteristic of the reflected signal from each of the plurality of antennas;

and selectively coupling the plurality of selected antennas to the transceiver.

As a further option of this related embodiment, selectively coupling the plurality of selected antennas to the transceiver includes selectively coupling the plurality of selected antennas to the transceiver via a programmable switching device. Furthermore, and optionally, selectively coupling the plurality of selected antennas to the transceiver via a programmable switching device includes selectively coupling the plurality of selected antennas to the transceiver in parallel via the programmable switching device.

Another related embodiment further includes a controllable impedance coupled to the plurality of antennas and to the processing circuitry, wherein the processing circuitry is configured to selectively control impedance between the RF transceiver and at least one antenna.

In another related embodiment, the at least one characteristic includes at least one of amplitude, phase, dispersion, waveform shape, or distortion.

In another embodiment, there is provided a wireless communications device having a housing, an RF transceiver disposed in the housing, a plurality of antennas coupled to the transceiver and distributed with respect to the housing, and processing circuitry disposed in the housing and coupled to the RF transceiver. The processing circuitry is configured to cause the RF transceiver to transmit an RF reference signal, to determine at least one characteristic of the RF reference signal reflected back from each of the plurality of antennas, to store the at least one determined characteristics, and to process the at least one determined characteristics in order to control at least one function of the device.

In a further related embodiment, the at least one characteristic includes at least one of amplitude, phase, dispersion, waveform shape, or distortion. Optionally, the at least one function includes at least one of selecting at least one antenna to couple to a transceiver, selecting at least one antenna to decouple from a transceiver, or coupling multiple antennas to form a larger effective antenna. Optionally, the processing the at least one determined characteristics in order to control at least one function includes characterizing at least one aspect of the environment around the device based on the at least one determined characteristics; and controlling at least one function of the device based on the at least one aspect. Optionally, the at least one aspect includes at least one of, the presence or absence of an object, the distance of an object from the device, the location of an object relative to the device, movement of an object relative to the device, orientation of an object relative to the device, a disposition of the device; or a time-of-flight measurement of an object to the device.

In a further related embodiment, the at least one function includes activating a feature of the device based on such characterization. Optionally, the feature is activated upon detecting that an object is approaching the device but before the object contacts the device. Also optionally, the at least one function includes controlling an application running in the device based on such characterization. Optionally, the object includes a body part.

In another embodiment, the invention provides a method of controlling at least one function of a wireless communications device providing RF communication using a wireless device having a plurality of antennas. The method includes:

at the wireless communications device, transmitting an RF reference signal;

determining at least one characteristic of the RF reference signal reflected back from each of the plurality of antennas;

storing the at least one determined characteristics; and processing the at least one determined characteristics in order to control at least one function of the device.

In a further related embodiment, the at least one characteristic includes at least one of amplitude, phase, dispersion, waveform shape, or distortion. Optionally, the at least one function includes at least one of selecting at least one antenna to couple to a transceiver, selecting at least one antenna to decouple from a transceiver, or coupling multiple antennas to form a larger effective antenna. Optionally, the processing the at least one determined characteristics in order to control at least one function includes characterizing at least one aspect of the environment around the device based on the at least one determined characteristic and controlling at least one function of the device based on the at least one aspect. Optionally, the at least one aspect includes at least one of the presence or absence of an object, the distance of an object from the device, the location of an object relative to the device, movement of an object relative to the device, orientation of an object relative to the device, a disposition of the device; or a time-of-flight measurement of an object to the device. Optionally, the at least one function includes activating a feature of the device based on such characterization. Optionally, the feature is activated upon detecting that an object is approaching the device but before the object contacts the device. Optionally, the at least one function includes controlling an application running in the device based on such characterization. Optionally, wherein the object includes a body part.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DESCRIPTION OF EXAMPLE EMBODIMENTS

Definitions

As used in this description and the accompanying claims, the following terms shall have the meanings indicated, unless the context otherwise requires:

A "set" has at least one member.

A "wireless communications device" is a device that has wireless communication capabilities, such as by Bluetooth, Wi-Fi, GSM (GPRS, 3G, 4G) or CDMA, GPS, RFID, or other wireless communication technology. A wireless communications device may be virtually any type of device, e.g., from mobile devices to anything that could be tagged in the physical world.

A "mobile communications device" is a portable wireless communications device.

With regard to a plurality of antennas, the term "distributed with respect to the housing" means that the antennas are placed at various locations within the housing and/or on one or more internal or external surfaces of the housing and/or forming one or more surfaces of the housing itself (e.g., all or part of a front, back, and/or outer edge of the housing).

Figure 1:
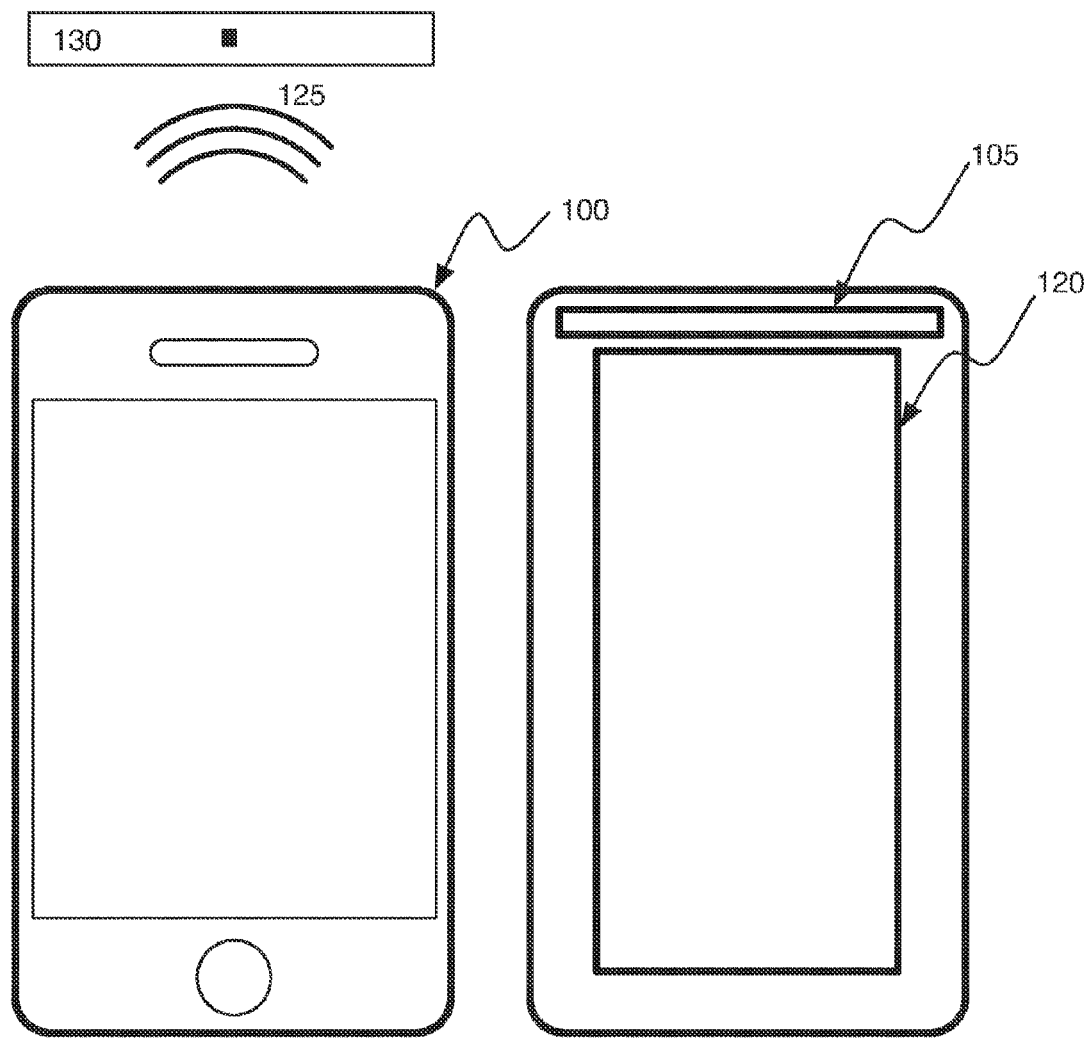
FIG. 1 schematically shows the front and back sides of a mobile communications device.

FIG. 1 schematically shows the front and back sides of an exemplary mobile communications device 100. The mobile device communicates wirelessly with various types of devices, such as base stations, satellites and other wireless devices, using any of a number of wireless protocols using electromagnetic waves as RF signals. In some mobile devices, the RF signal is at ISM-band frequencies, between about 2.400 GHz and about 2.483 GHz (used for IEEE 802.11 Wi-Fi and Bluetooth). In other mobile devices, the RF signal is transmitted at five GHz U-NII band frequencies, between about 4915 MHz and about 5825 MHz (used for Wi-Fi). In other mobile devices, the RF signal is at 1575.42 and 1227.60 MHz (used for GPS). In other mobile devices, the RF signal is at UMTS/LTE band frequencies, which may be about 800 MHz, about 850 MHz, about 900 MHz, about 1500 MHz, about 1700 MHz, about 1800 MHz, about 1900 MHz, or about 2100 MHz. Of course, other frequency bands may be supported by the mobile device. For each frequency band supported by the mobile device, an antenna must be able to transduce the electromagnetic wave into a voltage at a specified impedance. The mobile device typically has antennas that may be planar or three dimensional structures distributed with respect to a device housing, e.g., embedded within the mechanical structure of the device. There may be a number of antennas greater than, equal to or less than the number of wireless frequencies and standards supported by the device. A set of antennas may be around the perimeter of the device 100, on the back 120, and/or on the front. It should be noted that antenna 120 is simply a bounding box of a set of geometric patterns that define the set of antennas.

In this exemplary embodiment, an auxiliary antenna 105 is shown to interface the mobile device with one or more RFID tags 130 via a radio frequency field 125 at 840-960 MHz, or in principle other RF/microwave bands, such as 2.400-2.483 GHz. If the 2.400-2.483 GHz band is not available for RFID operation, the auxiliary antenna 105 may be needed. The primary purpose of the mobile device is for all communication other than the RFID function; therefore, the antennas 120 will occupy the largest area or volume of the accessible area of the device. Antenna 105 may not be the ideal geometry given the wavelength of interaction for RFID (typically 12-35 cm), but nevertheless, given a constrained geometry of a mobile phone, the compromise may be necessary.

Most materials are not RF transparent and will cause diffraction effects. One of the challenges with mobile devices is that human body parts, such as hands and arms, may attenuate the signal produced from a transmitter and/or may attenuate signals transmitted by other devices, e.g., due the absorption/redirection of radio frequency signals on the human body. For example, a hand holding a mobile communication device can affect transmission and reception of wireless communication signals.

Figure 2:
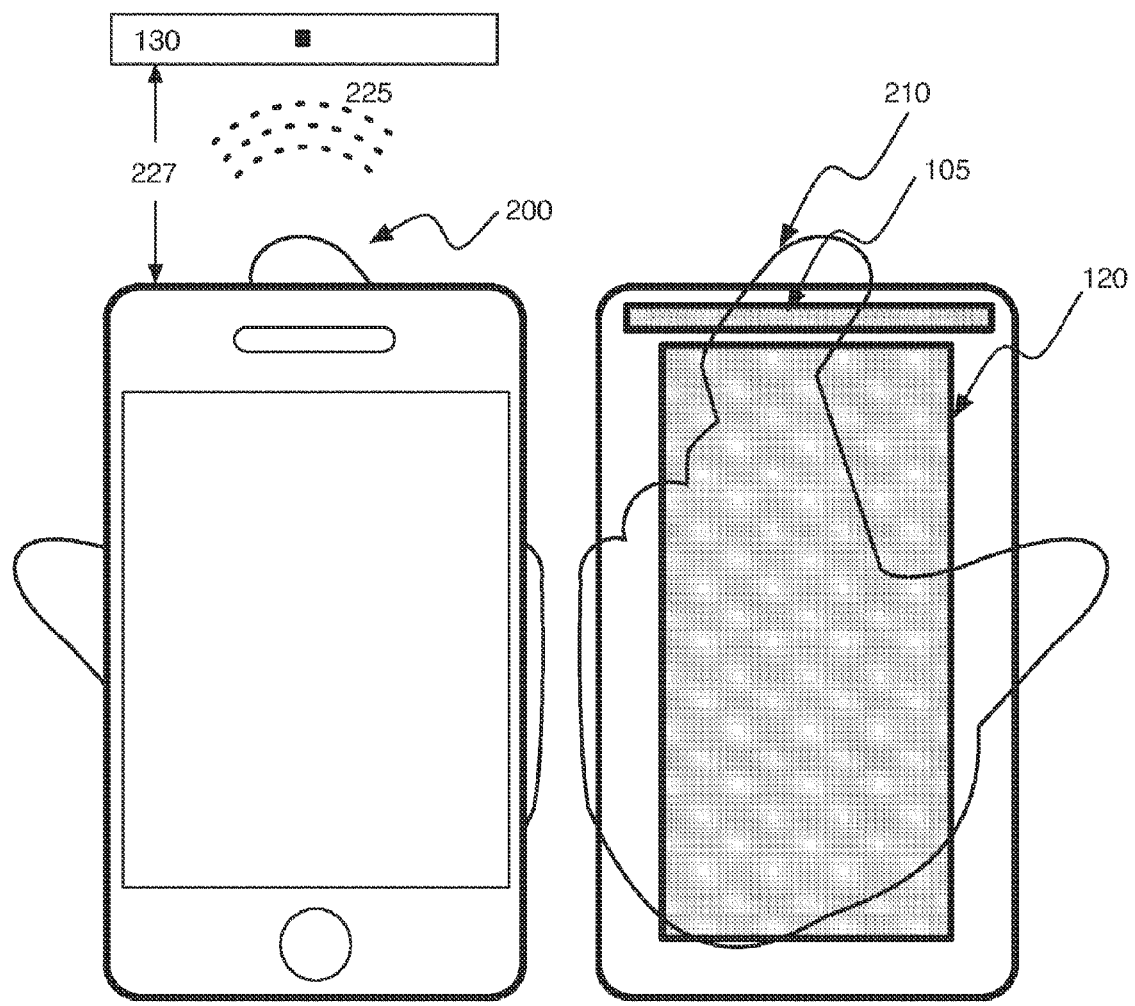
FIG. 2 schematically shows a hand holding the device of FIG. 1 on the back of the device.

FIG. 2 schematically depicts a hand 200 holding a device on the back of the device 210. In this case, the finger and proximity of the hand means the RFID antenna 105 is either poorly matched now and/or cannot radiate properly. In the state of the art, RFID reader circuitry incorporates self-jammer cancellation, return loss matching, or other means of improving the noise floor or dynamic range of the receiver. This may address the poor antenna match, but cannot address the diminished antenna radiation pattern. In the ideal case of RFID operation, at the point the RFID tag transitions from being powered to not-powered, termed the power up threshold, the receiver of an RFID reader still possesses sufficient receive margin to decode packets with very low probability of error, or packet error rate (PER). This is termed transmitter-limited. In the case where the receiver is the limiting factor, not the RFID tag, this is termed receiver-limited. As RFID tags 130 are powered by the RFID field 225, the hand blocking the RFID antenna 105 may diminish the tag read and write range to the extent that the tags may not power up in the manipulatory range 227. Note the data, location and voice-communication antennas 120 may also be subject to this change in antenna characteristics, but since the operational path loss for wireless data, location and voice communications is greater (90-150 dB) than RFID path loss (40-60 dB), the link margin in the presence of the hand usually remains positive. Therefore, the RFID communications system has two disadvantages to contend with in the incorporation of mobile phones relative to conventional data, location, and voice communications: a low link margin, and a sub-optimal antenna design on the mobile communications device.

In certain embodiments of the present invention, a wireless communications device includes multiple switchable antenna elements that may be used to improve interfacing of the wireless communications device with other devices, such as for interfacing of an RFID-equipped mobile communications device with other RFID devices (e.g., to better ensure power delivery to and/or communication with such other RFID devices) and/or may be used to characterize various aspects of the environment around the wireless communications device, such as to help create a more natural interface for allowing people to interact with the wireless communications device.

Figure 3:
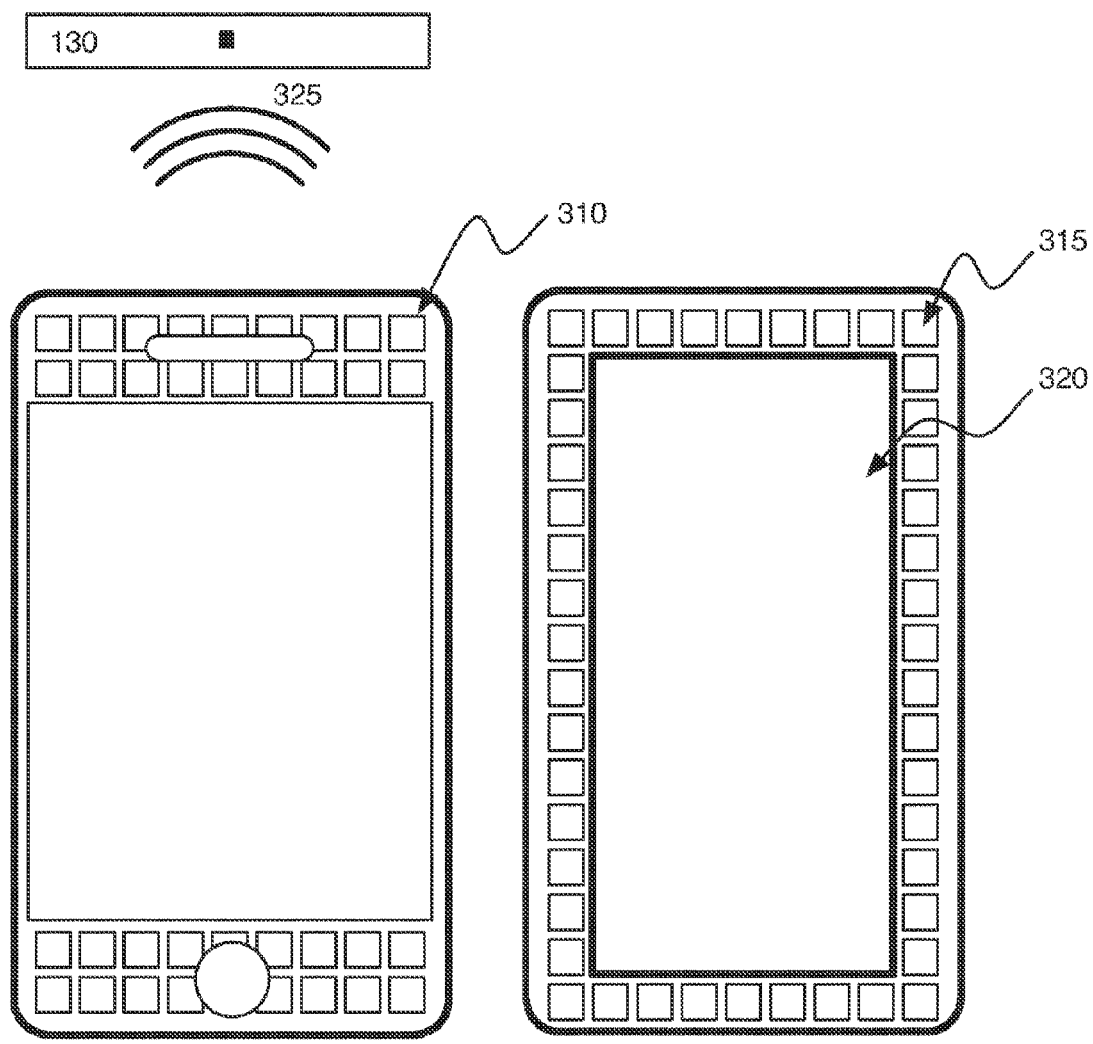
FIG. 3 shows an alternative design of an antenna system including N identical or different antenna elements, in accordance with an exemplary embodiment.

FIG. 3 shows an alternative design of an antenna system 300, including N identical or different antenna elements (310 for example), in accordance with one exemplary embodiment. These elements may exist in one embodiment exemplary as etched or printed elements on a printed or flexible circuit board, although the present invention is not limited to etched or printed antenna elements and instead can include one or more other types of antennas. The antennas may be virtually any shape, size, thickness, or placement. For example, using 3D printing or conventional machining technology, these elements may be three-dimensional metal structures. Each element may possess an independent path to the transmitter, or if configured for full flexibility, additionally or alternatively may allow a voltage, ground, resistive and/or reactive connection to neighboring elements to allow a larger antenna to be formed. The size, number and shape of the elements shown in FIG. 3 are only a suggestion of the design. The original far field antennas for data and voice communications 120 may also be included among the antenna elements, e.g., using M smaller antennas arranged in a periodic or aperiodic lattice. Thus, for example, antenna elements may be included for ISM-band frequencies between about 2.400 GHz and about 2.483 GHz (used for Wi-Fi and Bluetooth), for 5 GHz U-NII band frequencies between about 4915 MHz and about 5825 MHz (used for Wi-Fi), for 1575.42 and 1227.60 MHz band frequencies (used for GPS), for UMTS/LTE band frequencies (which may be about 800 MHz, about 850 MHz, about 900 MHz, about 1500 MHz, about 1700 MHz, about 1800 MHz, about 1900 MHz, or about 2100 MHz), for 840-960 MHz band frequencies (used for RFID), and/or for other RF/microwave bands. It should be noted that although this diagram shows the antenna elements as visible on the surface of the mobile communication device, this is for illustrative purposes and the antenna elements may not be visible, e.g., hidden under glass, plastic, ceramic, composite or other material.

Figure 4:
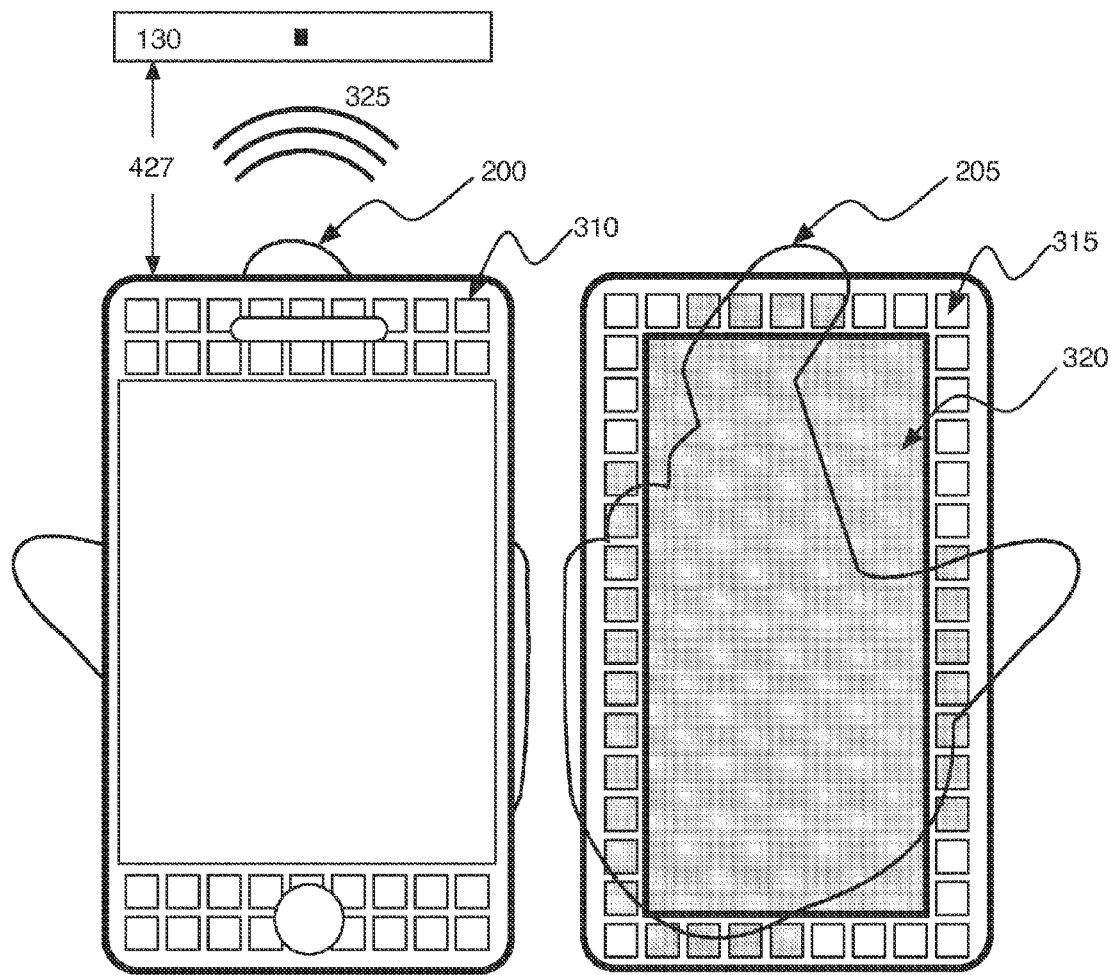
FIG. 4 shows the antenna configuration of FIG. 3 when the hand is present.

FIG. 4 shows the same antenna configuration 310 when the hand 200 is present. Although many antenna elements are covered on the back of the device by the hand 205, depicted as darkened elements, several antenna elements remain uncovered and can be connected to the transmitter independently of the poor return loss and radiating paths coupled to the hand. One example of an antenna element that is not impacted by the presence of the hand is 315. In certain embodiments, some or all of the free antenna elements may be connected in parallel to the transmitter and/or receiver of one or more radios. In other embodiments where a radio protocol has greater than one transmitter and/or receiver, free elements may be independently connected to each transmitter and receiver. In still other embodiments, some or all of the free antenna elements may be connected to each other to optimize radiation and power transfer. With regard to a mobile communications device with RFID communication capabilities as discussed with reference to FIGS. 1-2, utilizing the free antenna elements 315 unburdened by being connected to loaded antenna elements, it is assumed the RF field produced by the mobile communications device 325 will be greater in magnitude to the traditional design 105 shown in FIG. 2, but may be not as large as the RF field 125 when the hand is not present as shown in FIG. 1. If the RF field 325 is larger than the RF field 225, the read range 427 should be larger than 227, making the manipulatory space more reliable. It should be noted that this embodiment may be generalized such that the RFID tag 130 is another wireless communications device, and that antenna 320 could be composed of a plurality of antenna elements such as 310, 315.

Figure 5:
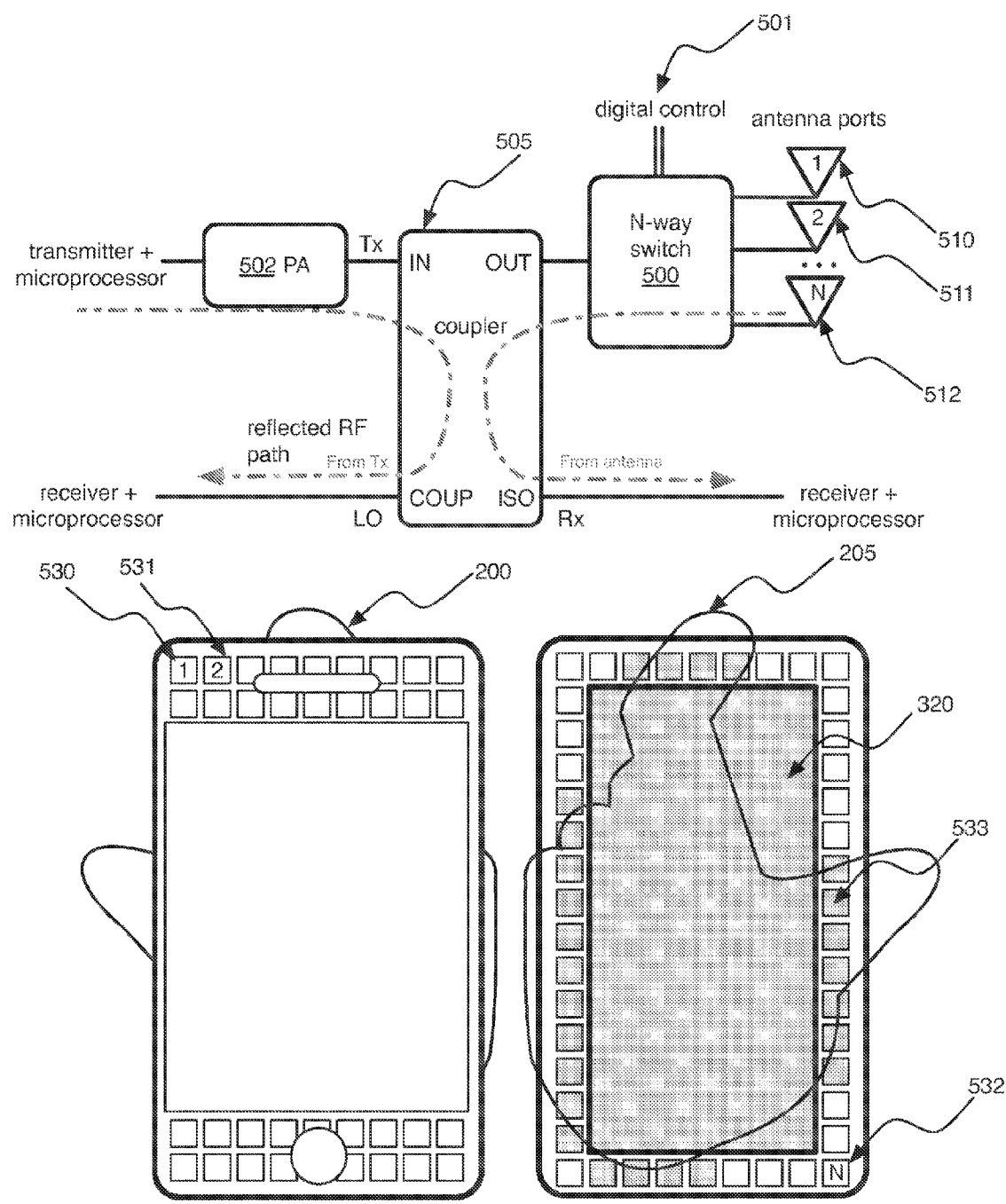
FIG. 5 is a schematic block diagram for circuitry used to implement the features of FIG. 4, in accordance with an exemplary embodiment.

FIG. 5 is a schematic block diagram for circuitry used to implement the features of FIG. 4, in accordance with an exemplary embodiment. As in a conventional RFID reader, a directional coupler 505 couples transmitter power to the OUT port; the directional coupler is coupled to one of N antenna ports 510-512 through a digitally controllable switch 500 controlled by digital signals 501. In some embodiments, the directional coupler 505 could be a circulator, and the COUP port would not be present. In this example, three of the N antennas 530-532 are highlighted. The ISO port of the directional coupler carries the power from the antennas that goes into the OUT port and directs this to the receiver. This includes the self-jammer from the transmitter and the RFID tag backscatter data, and the transmit power at the IN port that is reduced by the directional coupler isolation (typically 15-40 dB). The self-jammer level is a function of the transmit power level and the return loss of the antenna. The RFID tag backscatter data level is a function of the path loss to the RFID tag and the RFID tag itself. The COUP port contains the transmit power reduced by the coupling factor (typically 3-20 dB) and the antenna RF signal reduced by the directional coupler isolation (typically 15-40 dB). The coupled power, like the self-jammer level is a function of the transmit power. The antennas 510-512 shown have their corresponding bounding box antenna elements on the mobile device 530-532 with the hand 200, 205. In this embodiment, due to the N-way switch 500, only a single antenna element may be active at a time. However, by applying time-sequenced digital controls 501, the antenna patterns may use multiple antenna elements appropriately.

Figure 6:
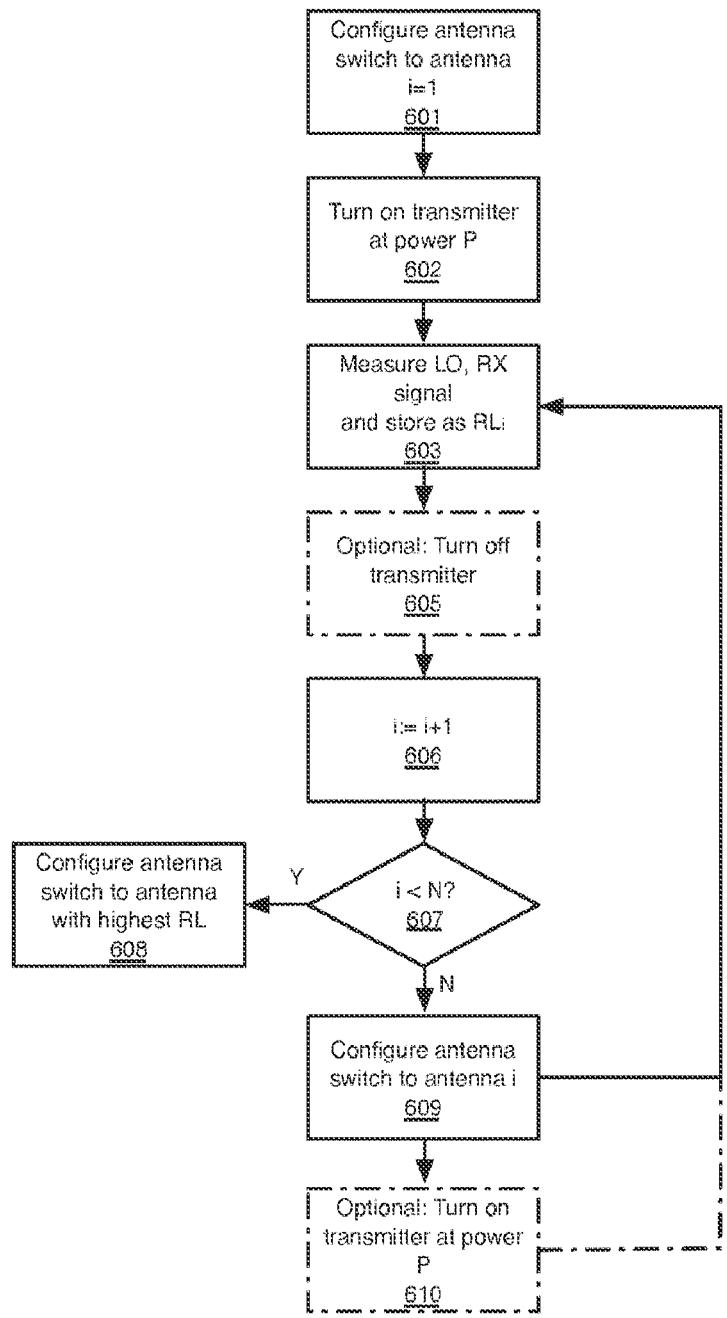
FIG. 6 is a logic flow diagram for determining the antenna(s) that should be selected in FIG. 5, in accordance with an exemplary embodiment.

FIG. 6 is a logic flow diagram for determining the antenna(s) that should be selected in FIG. 5, in accordance with an exemplary embodiment. At the start of the algorithm, the digital switch 500 is configured to switch position 1 601. If the analog switch can be damaged with the RF power on, the transmitter is optionally turned on to power P 602. This power may be lower than the final transmitter power, in order to save power. Measurements on the ISO and COUP ports are made on the directional coupler 505. The ISO port measures the RX signal, while the COUP port measures the TX signal. The pair of TX (power or I&Q signal) and RX (power or I&Q signal) may be stored as a vector. The transmitter is then optionally turned off 605, and the counter i is incremented 606. If the value of i is less than N 607, the antenna is switched to this new setting 609, and optionally the power is turned on to power P 610, then the cycle is repeated again 603. If i is equal to N 607, the antenna switch 500 is configured to choose the antenna with the lowest combined TX and RX vector norm or highest return loss in dB. In the case where the switch 500 allows multiple antennas to be connected together in parallel (corresponding loads may be present as well), two or more of the top M antennas (M<N) that have the lowest combined TX and RX vector norm or highest return loss in dB may be connected in parallel. If the top M elements cannot be connected together, the elements may be switched in a time-sequenced manner.

Figure 7:
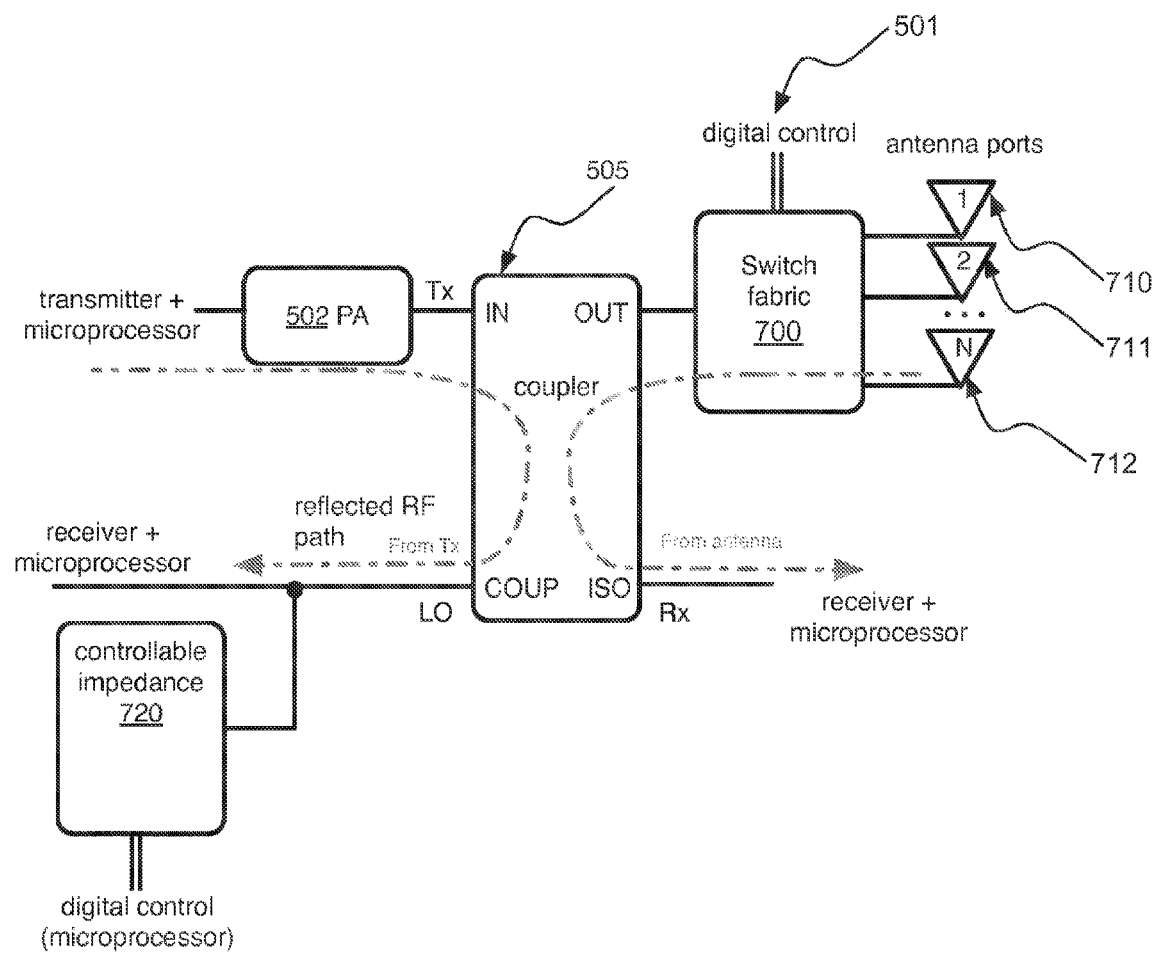
FIG. 7 is a schematic block diagram showing circuitry with multiple antenna elements connected to a switch fabric, in accordance with an exemplary embodiment.

FIG. 7 is a schematic block diagram showing circuitry with multiple antenna elements 710-712 connected to a switch fabric 700, in accordance with an exemplary embodiment. This fabric may allow neighboring antenna elements to be connected together to enable a larger antenna and/or may allow multiple non-neighboring antennas to be connected together. A controllable impedance 720 may be added to the COUP port of the directional coupler to allow energy to be maximally transferred from the transmitter, and for energy to be transmitted into the receiver (e.g., when the resulting antenna structure does not possess an impedance that matches the impedance of the transmit power amplifier (PA) 502 and directional coupler 505).

Figure 8:
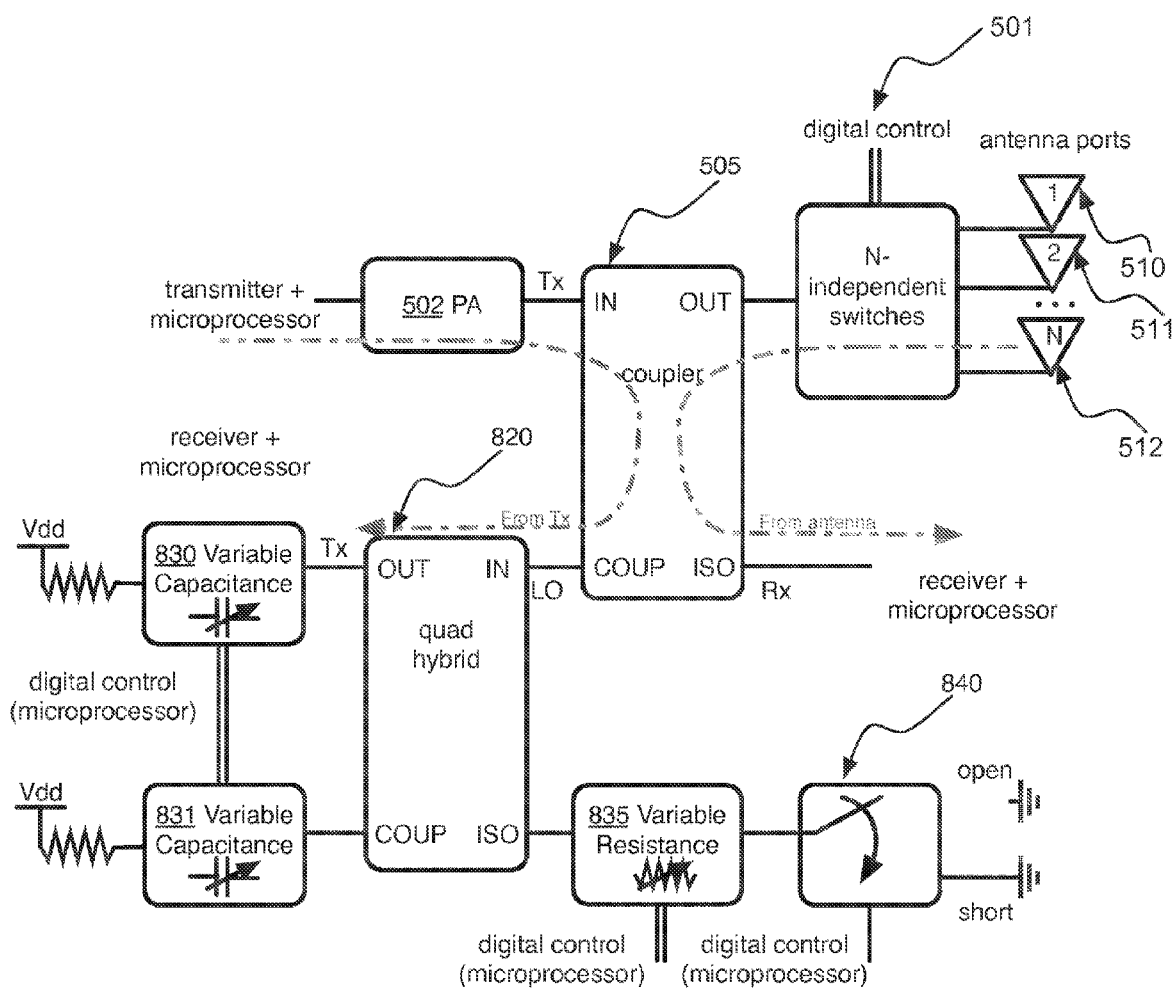
FIG. 8 is a schematic block diagram showing a more detailed circuitry implementation, in accordance with an exemplary embodiment.

FIG. 8 is a schematic block diagram showing a more detailed circuitry implementation, in accordance with an exemplary embodiment. The switch matrix is implemented as N-independent switches where antennas 510-512 may be connected in parallel. The controllable impedance is implemented as an impedance control circuit, for example an impedance control circuit as described in United States Published Patent Application No. US 2010/0069011, which is hereby incorporated herein by reference. A quadrature hybrid element 820 is similar to a directional coupler, except the coupling between the IN and OUT and the IN and COUP ports are equal and with a value of −3 dB. The phase relationship between the OUT and COUP ports is 90 degrees out of phase. On the OUT and COUP ports, variable capacitances 830-831 and variable resistance 835 on the ISO port allow one to create a range of complex impedances in one half of a Smith Chart. The open and short switch 840, allows one to flip location of the impedance to the other half of the Smith Chart.

Figure 9:
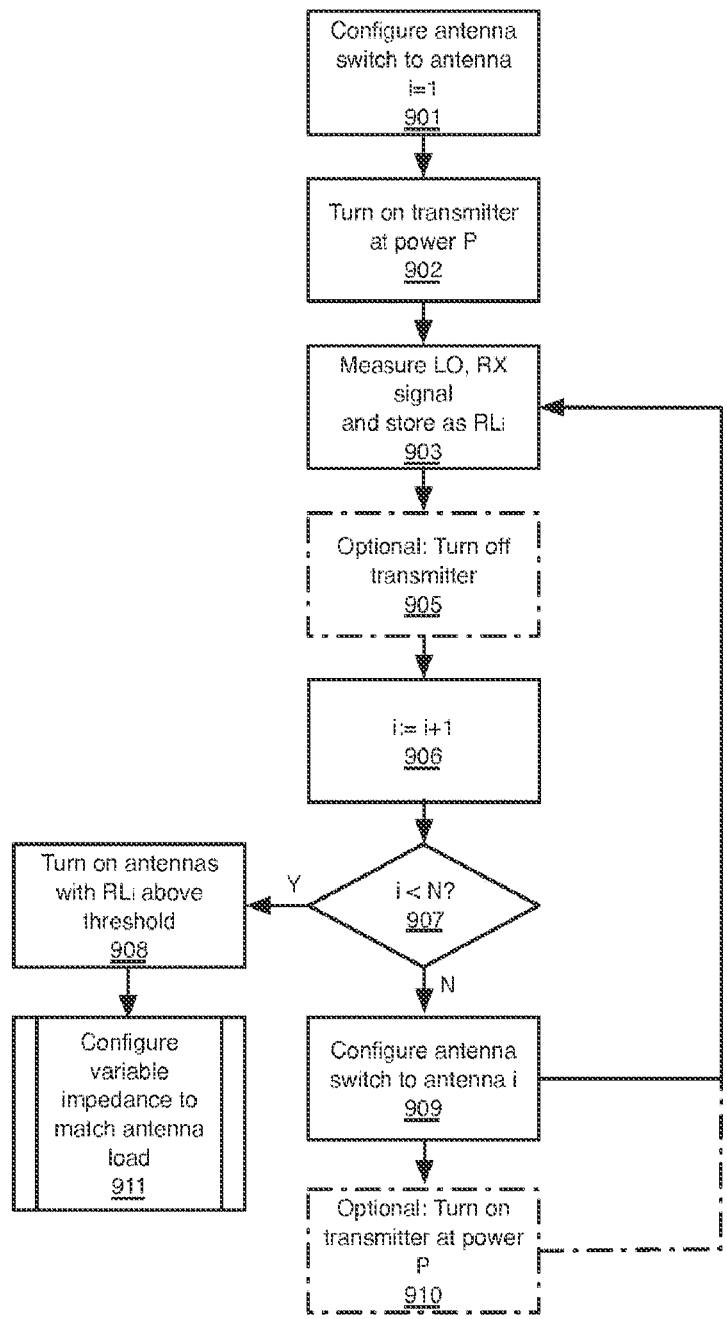
FIG. 9 is a logic flow diagram for determining the antenna(s) that should be selected in FIG. 8, in accordance with an exemplary embodiment.

FIG. 9 is a logic flow diagram for determining the antenna(s) that should be selected in FIG. 8, in accordance with an exemplary embodiment. At the start of the algorithm, the digital switch is configured 500 to switch position 1 901. If the analog switch can be damaged with the RF power on, the transmitter is optionally turned on to power P 902. This power may be lower than the final transmitter power, in order to save power. Measurements on the ISO and COUP ports are made on the directional coupler 505 at step 903. The ISO port measures the RX signal, while the COUP port measures the TX signal. The pair of TX (power or I&Q signal) and RX (power or I&Q signal) may be stored as a vector. The transmitter is then optionally turned off 905, and the counter i is incremented 906. If the value of i is less than N 907, the antenna is switched to this new setting 909, and optionally the power is turned on to power P 910, then the cycles is repeated again 903. If i is equal to N 907, the antenna switch 500 is configured to choose the antenna with the lowest combined LO and RX vector norm or highest return loss in dB 908. The variable impedance match 720 connected to the COUP port, such as that in FIG. 8 is changed to match the impedance to the connected antennas. In the case where the switch 500 allows multiple antennas to be connected together in parallel (corresponding loads may be present as well), the top M antennas (M<N) that have the lowest combined LO and RX vector norm or highest return loss in dB are selected. If the top M elements cannot be connected together, the switch elements may be switched in a time-sequenced manner.

In accordance with various alternative embodiments, multiple antenna elements and related circuitry and logic flows of the type discussed above can be used to characterize various aspects of the environment around the wireless communications device (referred to herein for convenience as proximity detection). Specifically, due to the fact that a portion of the transmitted RF signal may be reflected by an object back through the directional coupler (e.g., 505 in FIG. 5) into the receiver and a potential separate return path, the reflected energy can be characterized to detect such things as, for example, the presence or absence of an object (e.g., a person's hand or arm), the type of object (e.g., a metallic object vs. a body part), the distance of the object from the device, the location of the object relative to the device (e.g., whether the object at a front, back, or side of the device), movement of the object relative to the device (e.g., toward or away from the device and/or other movements), orientation of the object, etc. Thus, for example, processing circuitry in the device may transmit an RF reference signal, determine at least one characteristic of the RF reference signal reflected back from each of the plurality of antennas, and process the determined characteristics in order to control at least one function of the device (which may include control of an application running in the device). The RF reference signal may be constant (e.g., a single frequency) or may be variable (e.g., a sequence of different frequencies). The characteristic(s) can include such things as amplitude, vector, phase, dispersion, and/or shape or distortion of waveform of transmitted signal.

As but one example of a potential use for such proximity detection, a user interface for a device may utilize proximity information generated from such proximity detection to allow a user to control features of a device or application. As shown in FIGS. 4 and 5, the elements covered, for example 533, will show diminished return loss compared to the elements which are not covered, for example 530-532. This information may be used, for example, to detect the approach of a person to begin a user interface interaction even before the user makes physical contact with the device, thereby creating the impression of a magical experience for a user. The range at which return loss variations could be detected could be as small as contact with the mobile device, to several millimeters, to several tens of centimeters. The processing circuitry in the device may be implemented such that a significant increase in the backscatter signal without a tag response may indicate the presence of an object such as a hand or local body part. That is, the shielded antenna elements may be used for object detection. The shielded antenna elements may also be used to image the orientation of the object. The unshielded antenna elements may be used, for example, to interface with RFID tags or other backscatter devices. For example, currently, phones often will receive email updates by push methods, where a network socket is open and data from email providers is sent as soon as new email arrives into the account. Some email accounts receive email by checking email servers on some preset interval. These methods can appreciably drain a battery of a mobile device throughout the day. By being able to detect the human body approaching a device, it may provide sufficient time to wake up a device, connect to an email service, and start downloading email to the device, so that as soon as the user had logged into their device, the email appears ready. In other uses, proximity detection could be used quantitatively for interactivity (e.g., such as gaming or music creation), could be used to determine the disposition of the device (e.g., such as whether the device is being held, is placed in a holster, or is placed on a table, e.g., by virtue of different reflective characteristics of the different materials), could be used for security purposes (e.g., to verify that two communicating devices are near one another, or to verify that a person is present for a transaction), or could be used for other proximity-based functions.

In making a user interface that will separate manipulatory and ambulatory space for a mobile device interfacing with one or more RFID tags or other wireless devices, a time-of-flight-based measurement may be used to obtain an accurate separation of manipulatory and ambulatory space. For example, processing circuitry in the device can measure the time between transmitting an RF reference signal and receiving reflected energy at one or more of the antenna elements. Based on such time-based information, the device can determine, for example, the distance and/or location of an object relative to the device (e.g., if the reflection is received sooner at a first antenna element compared to a second antenna element—sometimes referred to as time-difference of arrival—then the object is likely to be closer to the first antenna element.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application.

Without limitation, potential subject matter that may be claimed (prefaced with the letter "P" so as to avoid confusion with the actual claims presented below) includes:

P1. A method of controlling a wireless device having a plurality of antennas, the method comprising:
  at the wireless device, transmitting an RF signal;
  receiving a portion of the transmitted RF signal reflected by the object by each of the antennas;
  determining the proximity of the object to the wireless device based on a signal strength of the received signal; and
  controlling the wireless device based on the proximity of the object.

P2. A method of detecting orientation of an object using a wireless device having a plurality of antennas, the method comprising:
  at the wireless device, receiving signals from each of the plurality of antennas;
  determining a signal level of each of the signals; and
  determining the orientation of the object based on the relative signal levels of the signals.

P3. A method according to claim P2, wherein determining the orientation of the object based on the relative signal levels of each of the signals comprises:
  shielding at least one of the antennas based on the relative signal levels; and
  determining the orientation based on at least one of a pattern of shielded antennas or a pattern of unshielded antennas.

P4. A mobile phone including an RFID reader.

P5. A mobile phone according to claim P4, further comprising at least one auxiliary antenna coupled to the RFID reader.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A wireless communications device comprising:
  a housing;
  a radio-frequency (RF) transceiver disposed in the housing;
  a plurality of antennas distributed with respect to the housing;
  a switch fabric coupled to the RF transceiver and the plurality of antennas, wherein the switch fabric is configured to couple the RF transceiver to one or more of the plurality of antennas; and
  circuitry disposed in the housing and coupled to the RF transceiver and switch fabric, the circuitry configured to:
    compare at least one characteristic of a reflected RF reference signal for each of the plurality of antennas with that of a transmitted RF reference signal to determine a return loss of each of the plurality of antennas;
    select at least two antennas of the plurality of antennas based on the at least one determined characteristic; and
    configure the switch fabric to couple the selected at least two antennas to the RF transceiver so that a signal received from the RF transceiver will be coupled to and transmitted by the at least two antennas at the same time.

2. The device of claim 1, wherein the return loss of each of the selected at least two antennas is higher than the return loss of each non-selected antenna of the plurality of antennas.

3. The device of claim 1, wherein coupling the selected at least two antennas to the RF transceiver comprises coupling the selected at least two antennas to the RF transceiver in parallel via the switch fabric.

4. The device of claim 1, further comprising a controllable impedance coupled to the RF transceiver, the switch fabric, and the circuitry, wherein the controllable impedance is controlled by the circuitry to provide an impedance between the RF transceiver and at least one antenna of the plurality of antennas.

5. The device of claim 4, wherein the controllable impedance provides the impedance between the RF transceiver and the at least two antennas of the plurality of antennas.

6. The device of claim 1, wherein the at least one characteristic includes at least one of:
  amplitude;
  power;
  energy;
  phase;
  dispersion;
  waveform shape; or
  distortion.

7. The device of claim 1, wherein the selected at least two antennas are neighboring antennas that together form a larger antenna.

8. The device of claim 1, wherein the switch fabric comprises a plurality of switches, each switch coupled to a respective antenna of the plurality of antennas.

9. A method comprising:
  by a wireless communications device, comparing at least one characteristic of a reflected radio-frequency (RF) reference signal for each of a plurality of antennas with that of a transmitted RF reference signal to determine a return loss of each of the plurality of antennas;
  by the wireless communications device, selecting at least two antennas of the plurality of antennas based on the at least one determined characteristic; and
  by the wireless communications device, configuring a switch fabric to couple the selected at least two antennas to a RF transceiver so that a signal received from the RF transceiver will be coupled to and transmitted by the at least two antennas at the same time.

10. The method of claim 9, wherein the return loss of each of the selected at least two antennas is higher than the return loss of each non-selected antenna of the plurality of antennas.

11. The method of claim 9, wherein coupling the selected at least two antennas to the RF transceiver comprises coupling the selected at least two antennas to the RF transceiver in parallel via the switch fabric.

12. The method of claim 9, wherein the wireless communications device comprises a controllable impedance coupled to the RF transceiver and the switch fabric, wherein the controllable impedance is configured to provide an impedance between the RF transceiver and at least one antenna of the plurality of antennas.

13. The method of claim 12, wherein the controllable impedance provides the impedance between the RF transceiver and the at least two antennas of the plurality of antennas.

14. The method of claim 9, wherein the at least one characteristic includes at least one of:

amplitude;
power;
energy;
phase;
dispersion;
waveform shape; or
distortion.

15. The method of claim 9, wherein the selected at least two antennas are neighboring antennas that together form a larger antenna.

16. The method of claim 9, wherein the switch fabric comprises a plurality of switches, each switch coupled to a respective antenna of the plurality of antennas.

17. One or more computer-readable non-transitory storage media embodying software that is operable when executed by a wireless communications device to:
compare at least one characteristic of a reflected radio-frequency (RF) reference signal for each of a plurality of antennas with that of a transmitted RF reference signal to determine a return loss of each of the plurality of antennas;
select at least two antennas of the plurality of antennas based on the at least one determined characteristic; and
configure a switch fabric to couple the selected at least two antennas to a RF transceiver so that a signal received from the RF transceiver will be coupled to and transmitted by the at least two antennas at the same time.

18. The media of claim 17, wherein the return loss of each of the selected at least two antennas is higher than the return loss of each non-selected antenna of the plurality of antennas.

19. The media of claim 17, wherein coupling the selected at least two antennas to the RF transceiver comprises coupling the selected at least two antennas to the RF transceiver in parallel via the switch fabric.

20. The media of claim 17, wherein the wireless communications device comprises a controllable impedance coupled to the RF transceiver and the switch fabric, wherein the controllable impedance is configured to provide an impedance between the RF transceiver and at least one antenna of the plurality of antennas.

21. The media of claim 20, wherein the controllable impedance provides the impedance between the RF transceiver and the at least two antennas of the plurality of antennas.

22. The media of claim 17, wherein the at least one characteristic includes at least one of:
amplitude;
power;
energy;
phase;
dispersion;
waveform shape; or
distortion.

23. The media of claim 17, wherein the selected at least two antennas are neighboring antennas that together form a larger antenna.

24. The media of claim 17, wherein the switch fabric comprises a plurality of switches, each switch coupled to a respective antenna of the plurality of antennas.

* * * * *